No. 854,643. PATENTED MAY 21, 1907.
J. HARTNETT & D. M. ROBISON.
COW MILKING APPARATUS.
APPLICATION FILED SEPT. 26, 1904.
4 SHEETS—SHEET 1.
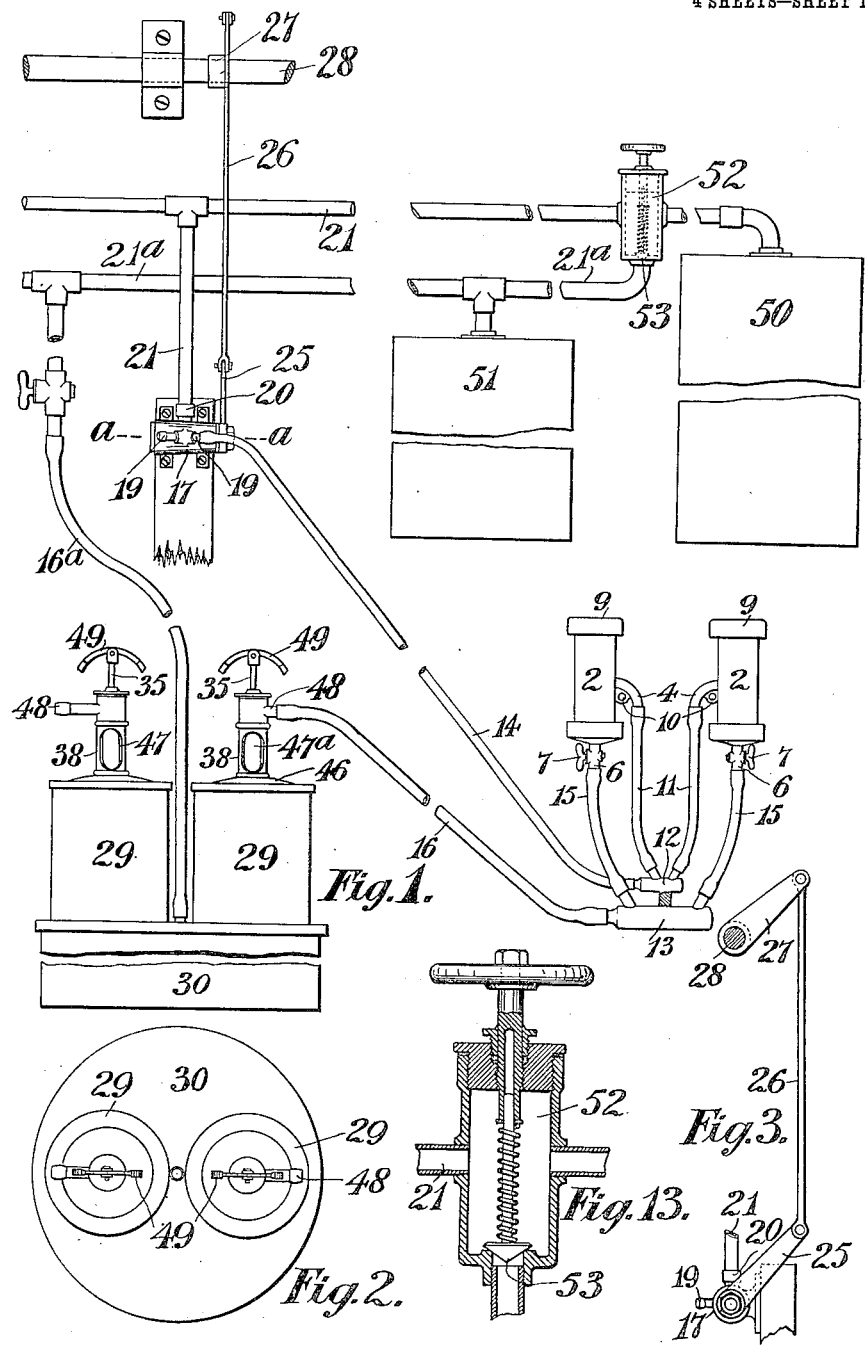

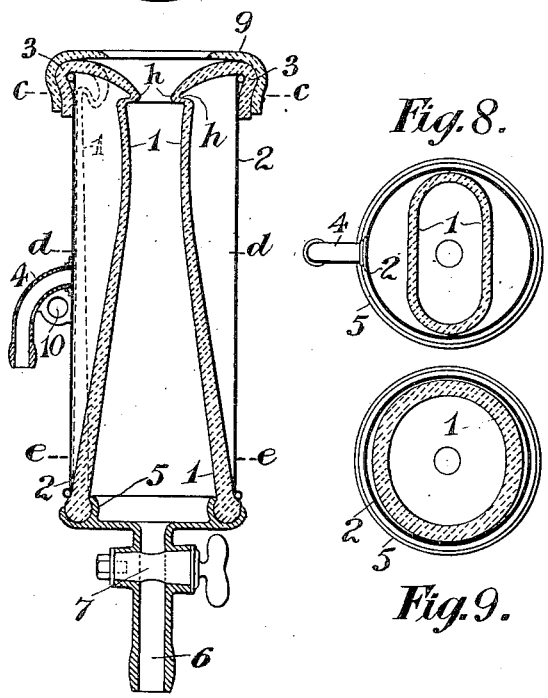

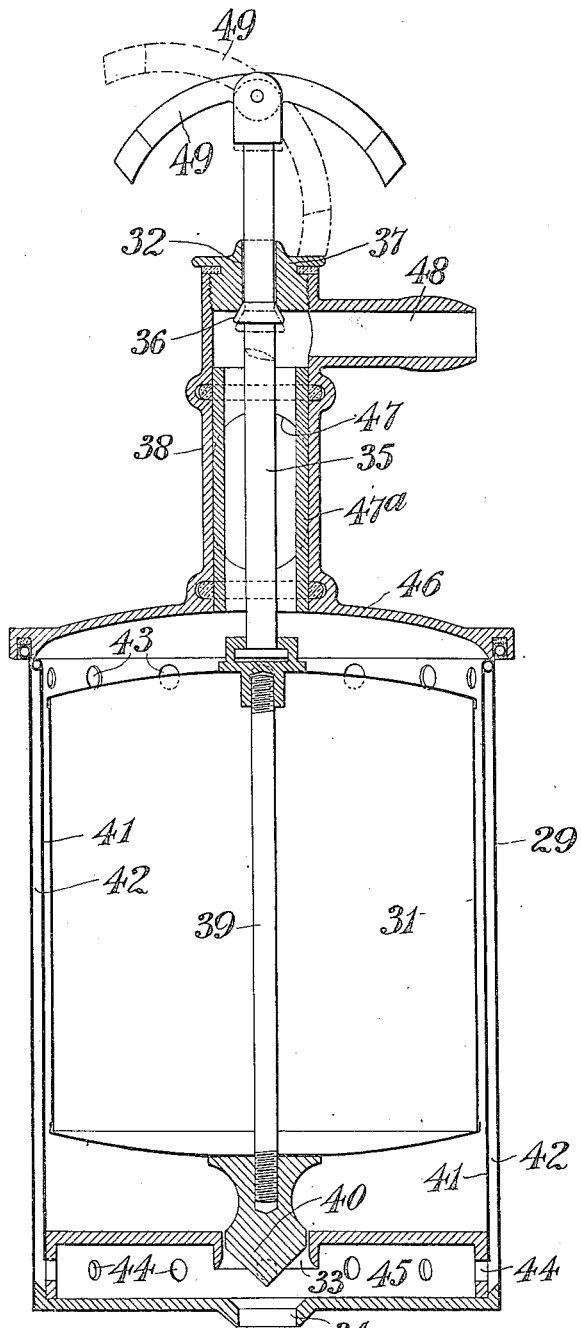

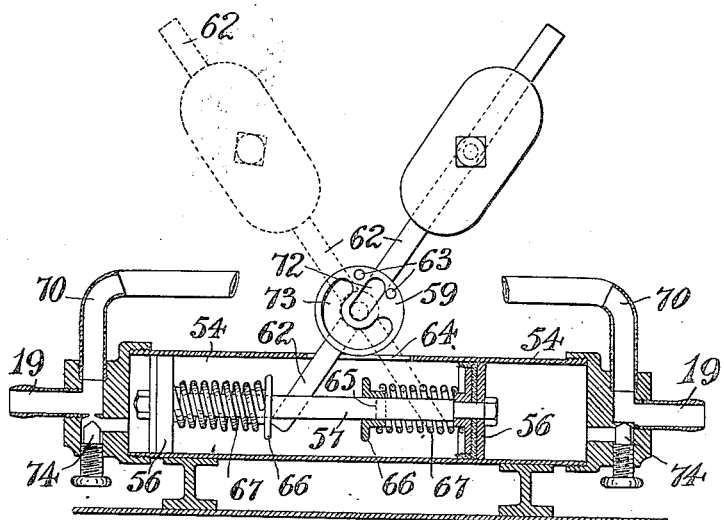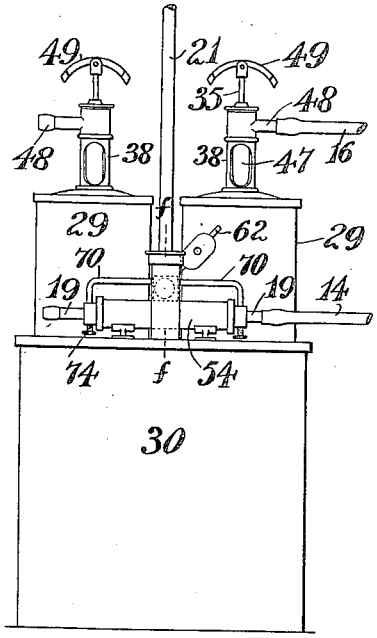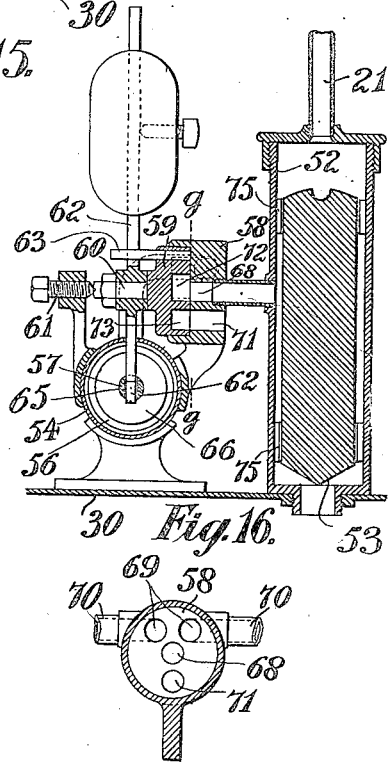

UNITED STATES PATENT OFFICE.

JOHN HARTNETT, OF BALWYN, AND DAVID MOFFATT ROBISON, OF ST. KILDA, VICTORIA, AUSTRALIA.

COW-MILKING APPARATUS.

No. 854,643.  Specification of Letters Patent.  Patented May 21, 1907.

Application filed September 26, 1904. Serial No. 226,027.

*To all whom it may concern:*

Be it known that we, JOHN HARTNETT, residing at Yerrin street, Balwyn, engineer, and DAVID MOFFATT ROBISON, residing at Lauriston Church Square, Ackland street, St. Kilda, engineer, both in the British State of Victoria, Commonwealth of Australia, and subjects of the King of Great Britain and Ireland, have invented new and useful Improvements in Cow-Milking Apparatus, of which the following is a specification.

This invention relates to improvements in cow milking apparatus wherein a differential vacuum is employed, that having the higher degree acting intermittently in the annular space between a rubber lining or sleeve (hereinafter termed a lining) and the rigid casing of a teat cup in order to expand the said lining to allow the teat to fill with milk, while the lower degree vacuum acts constantly (while the cow is being milked) within the said rubber lining and in the milk receptacle or pail in order to hold the cup upon the teat, to assist the lining to crush or squeeze the teat and to assist the flow of the milk. The intermittent or pulsating action of the high degree or superior vacuum is controlled by a novel pulsator appliance which alternately opens communication between the high degree vacuum main and said annular space in teat cup and between the atmosphere and said annular space in order to first expand the lining to relieve its pressure from about the teat and then allow the lining while returning to its normal state to crush or squeeze the teat. Also an improved automatic cut off appliance is preferably employed and which is designed to release the teat cups when the cow is sufficiently milked. Further two vacuum reservoirs are provided one for the high degree or superior vacuum and the other for the low degree vacuum and which latter is produced by employing a reducing valve between the said high vacuum reservoir or its main and the low vacuum reservoir which is in constant communication with the milk receptacle or pail.

The invention also comprises modifications in construction of the teat cup and pulsating appliance and in combinations of the several improvements or parts.

The improvements will now be fully described aided by a reference to the accompanying sheets of drawings throughout which similar numerals will be employed to indicate corresponding parts. Figures 1, 2, 3 and 14 being drawn to a smaller scale than the other figures.

Fig. 1 shows a general arrangement of a milking apparatus embodying our improvements. Fig. 2 a plan of the milk receptacle and its automatic releasers. Fig. 3 a side view of the lever gear for operating the pulsator appliance shown in Fig. 1. Fig. 4 a central longitudinal section of the pulsator appliance taken on line $a\,a$ of Fig. 1 and Fig. 5 a section on line $b\,b$ of Fig. 4. Fig. 6 a central section through one form of teat cup and Figs. 7, 8 and 9 sections on lines $c\,c$, $d\,d$, and $e\,e$ respectively of Fig. 6. Fig. 10 a similar view to Fig. 6 of a modified form of teat cup and Fig. 11 a top plan of same. Fig. 12 a central vertical section of the automatic releaser shown in Figs. 1, 2 and 14. Fig. 13 a central vertical section of the spring loaded vacuum reducing valve shown in Fig. 1. Fig. 14 is a side view of the milk receptacle and releasers shown in Fig. 1 but furnished with a modified form of pulsator appliance. Fig. 15 a central longitudinal section of the pulsator appliance shown in Fig. 14. Fig. 16 a section of same taken on line $f\,f$ of Fig. 14 and Fig. 17 a section taken on line $g\,g$ of Fig. 16 showing the construction of the valve box.

Each teat cup is constructed of a rubber lining 1 arranged within a tubular metallic casing 2 and said lining tapers from about two inches bore at its bottom end to about three quarters of an inch, one inch below its top end, whereat it is of an oblong or of an approximately oval section although it may be circular at such position and whereat it is weakest as from such point the rubber gradually increases in thickness toward both its end parts, which are circular. The upper end part of the rubber sleeve 1 is turned over at 3 upon the rigid metallic tubular casing 2 which has a branch 4 at its side. The lower end part of the rubber sleeve 1 (Fig. 6) is made into the form of a bead which takes into a suitably grooved metal cap 5 which is provided with a nozzle 6 and tap 7 while the lower end of casing 2 fits closely upon outside of lining 1. In Fig. 10 the lower end part of lining 1 is turned over upon the end part of casing 2 and then covered by a metal cap 8 which is also provided with a tap and nozzle. The upper end of each teat cup is furnished with an annular rubber flange or cap 9 the rim of which fits over the outer portion of lining 1, or said cap may be formed integral with the rubber lining. An eyelet 10 is formed where shown to receive a cord or chain by means of which the teat cup is suspended when freed from the cow's teat.

The lining 1, shown in Fig. 6, at its smallest internal part has a bead corrugation or projection $h$ which allows freedom for the lining to expand to about the position indicated by dotted lines in said figure, also said projection imparts an efficient crushing action on the teat near its root to close the passage way through it from under while the milk in teat is being withdrawn. In Fig. 10 the lining 1 is bell mouthed at its top and circular at its smallest part although it also may be of oblong or other section thereat.

The branch 4 at side of teat cup is connected by a tube 11 with a small chamber 12 carried on the claw 13 and said chamber is connected by a tube 14 with the pulsator appliance, also each nozzle 6 at bottom of teat cup is connected by a tube 15 with a nozzle on the claw 13 and said claw is connected by tube 16 with the automatic releaser, or when the latter is not used, direct with the milk receptacle or pail 30 while 16$^a$ is a pipe connecting milk pail with the low degree vacuum main.

The pulsator appliance shown in Figs. 1, 3, 4 and 5 consists of a casing 17 furnished with a chamber or branch 18 provided with two nozzles 19 each of which receive the end of a tube 14 leading from a chamber 12 on separate claws 13 (there being one claw for each cow) also casing 17 has another branch 20 for connection to the high or superior vacuum main 21 and further it has a port or opening 22 which is open to the atmosphere. Within said casing 17 is a tapered plug 23 the latter having a port or passage 24 at its side which may be so placed as to connect any two of the adjoining openings or branches as by connecting branches 18 and 20 the high vacuum is admitted to the annular chamber in teat cups while by connecting branches 18 and 22 atmospheric pressure is admitted to said annular chamber. Also the plug may be placed as shown in Fig. 5 to close communication between the said branches. The plug 23 is fitted at its smaller end with a lever 25 which is connected by a rod 26 with another lever 27 on a rock or oscillating shaft 28 so that an oscillating movement is given to the plug 23 for the purpose hereinbefore stated. Said pulsator appliance is furnished with a bracket so that it may be conveniently secured to be operated and connected up as described.

The automatic releaser 29 shown in Figs. 1, 2, 12 and 14 is preferably arranged upon the cover of the milk receptacle or pail 30, although it may be separate therefrom and be connected with it by a tube or pipe. The said releaser consists of a float 31 controlling three passage ways 32, 33 and 34, passage way 32 is an annular air way about a spindle 35 secured to the top of float, said spindle having a valve 36 on it which controls the passage way 32 formed in the cover 37 of a tubular neck piece 38. Also valve 36 forms a stop which determines the height to which the float will rise. Secured by a through rod 39 to bottom of float is a combined throttle and shut off valve 40 which is designed to regulate the quantity of milk retained in the float-chamber and to shut off the low degree vacuum when the milk ceases to flow from cow. Said valve 40, as shown in Fig. 12, fits freely in passage way 33 formed in the central part of the bottom of float chamber and when the valve is in the position shown the milk drips slowly through said passage. The bottom end of valve 40 is made conical to fit a seating formed about passage way 34 in bottom plate of releaser and when thereon cuts off communication with the milk receptacle. Said float 31 is arranged in a cylindrical casing 41 forming the float chamber between which and outer casing 29 is an annular space or milk passage way 42 communication to which is had from float chamber at its upper end by holes or ports 43 and from the lower part of annular space 42 by ports or holes 44 (which lie below the bottom plate of float chamber) to the lower chamber 45 from which the milk flows through passage 34 to the milk receptacle. The upper part or cover 46 of releaser has its tubular neck 38 furnished with sight holes 47 which expose an inner glass tube 47$^a$ while at one side of neck is a branch or nozzle 48 which is connected to tube 16 leading to the teat cup claw 13. Centered at the top end of spindle 35 is a balanced prop or holder 49 the object of which is to hold the float partially up and by so doing throttle the passage 33 and open the passage 34 leading to the milk receptacle 30 and thus provide a way or communication for the low degree vacuum between the milk receptacle and the teat cups.

Two vacuum reservoirs 50 and 51 are employed the first being for the high degree vacuum which is used to produce the pulsations, on the rubber teat lining 1 through the medium of the pulsator appliance 17, and the other reservoir for the low degree vacuum which is produced through the medium of a reducing valve 53 located in a valve box 52. The high vacuum reservoir 50 is connected with an air or vacuum pump or steam jet (not shown) and the high vacuum main 21 with the low vacuum reservoir 51 through the intervention of the reducing valve 53. The reducing valve is preferably of the spring loaded type as shown in Fig. 13 said valve being placed between the two vacuum reservoirs 50 and 51 with its valve controlled outlet leading by pipe 21ª to the low vacuum reservoir while its other branches are connected with the high vacuum main 21. In place of the spring-loaded valve Fig. 13 a dead weight valve as shown in Fig. 16 may be employed.

In Figs. 14 to 17 a modified form of the pulsator appliance is shown. It consists of a cylinder 54 mounted preferably on the milk receiver 30 and provided with a nozzle 19 at each end for connection to the tube 14 leading through chamber 12 on claw to the side of teat cups, said cylinder is furnished with two pistons 56 secured one at each end of a piston rod 57. A circular valve box 58 is carried by a bracket from the cylinder and it is provided with a circular oscillating valve 59 the spindle 60 of which is supported at its outer end by a screwed pivotal pin 61 carried in another bracket projecting up from cylinder. The valve 59 is controlled by a weighted reciprocating lever 62 centered on said valve spindle and having its upper weighted part arranged to work between two pins 63 projecting from back of valve 59. The lower portion of said lever passes through a groove 64 in the top of cylinder casing and then descends into and through a slot 65 in the piston rod, its lowermost end bearing alternately against one of two collars 66 which are loose on piston rod 57 and each of said collars bear against a coiled spring 67 while the other end of each spring bears against the back of a piston. Valve box 58 has a central hole or port 68 through which the high pressure vacuum is admitted also two ports or passages 69 which lead by pipes 70 to each end of the cylinder and further it has a through port 71 leading to atmosphere. The valve 59 has a recessed port 72 for leading the high pressure vacuum to either end of cylinder and through nozzles 19 to the annular chamber in teat cups, and also it has a semi-annular recessed exhaust port 73 which opens either end of cylinder and the annular space in teat cups through port 71 to atmosphere. The area of passage way between pipes 70 and each end part of cylinder is regulated by screwed valves 74. It is by the reciprocating movement of the pistons when acted on alternately by the vacuum that the weighted lever 62 is canted from one side of its vertical center to the other such being aided by the coiled spring forcing the lever over its center and thus taking the valve with it to place its ports in position to allow of a vacuum being created in the other end of cylinder to produce the opposite stroke and so alternate pulsations in the two sets of teat cups by the high pressure vacuum passing alternately through the nozzles 19 leading to said teat cups. As shown in Fig. 16 the central or high vacuum port 68 leads from a modified form of dead weight reducing valve 53 the upper end of the casing 52 of which is connected to the high vacuum main 21 while its lower end has a seating for valve 53 and below it is a passage way for the low degree vacuum. Said dead weight valve 53 being loose in its casing is guided by the side ribs 75.

When the apparatus is in operation the normal action of the linings 1 squeezes or crushes the teats in order to expel the milk but when the high vacuum is admitted through medium of the pulsator to the annular space between said linings and the rigid casing, the linings are expanded to about the position (shown by dotted lines in Fig. 6.) at same time allowing the teat to expand and fill with milk, then when the high vacuum is released by the pulsator admitting air to said annular space the linings resume their normal positions and in doing so squeeze or crush the teats and more so near their root whereat by aid of the projecting beads the passage way to udder is closed when the milk is readily withdrawn and expelled from the teat. The low vacuum which is constant inside the linings as before described holds the teat cups in position upon the teats and assist the linings to crush the teats as well as assisting the flow of the milk and such operation continues until the automatic releaser cuts off the vacuum within the teat cup lining.

The complete operation of the automatic releaser is as follows:—The float is first partially raised by placing the balanced prop 49 in an approximately vertical position, as shown by dotted lines in Fig. 12, with one end resting on the top of neck then the teat cups are placed in position on the cow. As soon as a sufficient quantity of milk reaches the float chamber the float 31 will rise and shut the valve 30 also the balanced holder 49 will by spindle 35 rising be freed and swing to its horizontal idle position. The float will now remain up as long as milk is flowing from the cow and which milk consequent on the float chamber being full finds a rapid outlet from releaser through ports 43, annular channel 42 and ports 44 into lower chamber 45 and from it through passage 34 to the milk receptacle. When the milk ceases to flow from the cow the milk which is below and around the float 31 drains more freely from the float chamber 41 through the throttled passage way 33. Meanwhile the float will gradually fall and carry its attached valves with it and when the throttle part of valve 40 is just below the opening 33 the area of outlet way is increased (by reason of the hollowed side of valve) thus allowing the milk remaining in the float chamber to drain quickly away when the float will fall and its lower conical valve will close passage way 34 and thus shut off the vacuum from the milk receiver, at the same time the air admitted through the annular space 32 around spindle 35 destroys the low vacuum in the tubes and teat cups when the latter will fall from the teats and swing clear of the cow and ground, through the teat cups as before stated being suspended by a cord or chain.

Having now described our invention what we claim as new and desire to secure by Letters Patent is:

1. In cow milking apparatus an automatic releaser having a float, provided at its bottom with a throttle and vacuum cut-off valve the former for throttling a passage way in bottom of float chamber and the latter for closing a passage way leading to the milk receptacle substantially as described and shown.

2. In cow milking apparatus an automatic releaser consisting of a float controlling three valves and arranged within a float chamber which has a milk exit way at its sides and bottom, the said exit way being in communication with the float chamber at its top and at its bottom with the lower chamber leading to the milk receptacle while at top part of releaser is a neck having a sight tube and a nozzle for connection to a tube leading to teat cups and on the top end of spindle above the neck cap a cam prop all substantially as described and shown.

3. In cow milking apparatus, teat cups, to which a differential vacuum is imparted, an intermittent high degree vacuum being created within chamber about the linings and a low degree constant vacuum in interior chamber of linings, combined with a pulsating appliance and milk pail and their connecting tubes and with a high and a low degree vacuum reservoir or mains having a reducing valve between them substantially as described and shown.

4. In cow milking apparatus the combination of a high degree vacuum pipe 21 leading to reservoir 50, reducing valve 53, low degree vacuum pipe 21ª leading from the latter and communicating with the low degree vacuum reservoir 51 and by pipe 16ª with the milk pail 30 substantially as described and shown.

5. In cow milking apparatus the combination of a high degree vacuum pipe 21 and its reservoir 50 reducing valve 53, low degree vacuum pipe 21ª leading to low degree vacuum reservoir 51 and by pipe 16ª to the milk pail 30 and the high degree vacuum pipe leading to pulsator 17 substantially as described and shown.

6. In a cow milking apparatus, a teat cup having a flexible lining provided near its open end with stiffened opposing inner teat crushing portions adapted to crush the teat near its root and thereby close the passage from udder to teat while the milk is being withdrawn from the teat.

7. A milking apparatus, wherein a differential vacuum is employed, comprising a teat cup having a casing and a flexible lining forming a high-degree-vacuum space within the casing and around the lining, intermittingly operating means comprising a pulsator for intermittingly maintaining the high degree vacuum in said space and opening said space to the atmosphere, and means for constantly maintaining a low-degree vacuum within said lining, substantially as described.

8. In a milking apparatus, wherein a differential vacuum is employed, comprising a teat cup embodying a casing and a flexible lining, a high-degree vacuum space being formed at the exterior of the lining, said teat cup having means to intermittingly release and crush the teat near its root, means for intermittingly opening said space to communication with the atmosphere and maintaining the high degree-vacuum therein, and means for constantly maintaining the low-degree vacuum within said lining.

9. In a cow milking apparatus, a teat cup comprising a flexible lining which is thickest at both ends, and a rigid tubular casing within which said lining is secured, means for alternately reducing the pressure and restoring atmospheric pressure at the exterior of said lining, and means for constantly maintaining a low-degree vacuum in said lining.

10. In a cow milking apparatus, a teat cup having a flexible lining provided at its smallest part and at each side with an inner rib, corrugation or projection located near its top end to operate on the teat near its root and designed to close the passage way from udder to teat thereat, while the milk is being withdrawn from teat, substantially as described.

11. In a cow milking apparatus, a teat cup comprising a metallic casing and a flexible lining within and spaced from the casing, means for intermittingly exhausting the air from the chamber between the casing and lining, and means for maintaining a low-degree vacuum within the lining.

12. In a cow milking apparatus, a teat cup comprising a casing and a flexible lining within the cup, means for intermittingly creating a high degree vacuum between the lining and casing, and means for creating a constant low degree vacuum within the lining.

13. In a cow milking apparatus, a teat cup comprising a casing and a lining within the casing, means for maintaining a constant low degree vacuum within the lining, means for creating a high degree vacuum between the lining and casing, and means for admitting atmospheric pressure between the lining and casing between the intervals of operation of the high degree vacuum.

14. In a cow milking apparatus, a teat cup comprising a casing and a flexible lining therein, a pulsator in communication with a vacuum chamber, the teat cup and the atmosphere, and a valve within the pulsator operating to alternately connect the space between the casing and lining with the vacuum chamber and with the atmosphere.

15. In a cow milking apparatus, a teat cup comprising a casing and a flexible lining, means for alternately creating a vacuum within and at the exterior of the lining, and means to automatically release the vacuum at one surface of the lining, whereby to automatically discontinue the action of the apparatus.

16. In a cow milking apparatus, a teat cup comprising a casing and a flexible lining therein, means for creating a high degree vacuum on one side of the lining, means for creating a low degree vacuum on the opposite side of the lining, and means to automatically release said low degree vacuum to discontinue the action of the apparatus.

17. In a cow milking apparatus, a teat cup comprising a casing and a flexible lining therein, means for creating a high degree vacuum on one side of the lining, means for creating a low degree vacuum on the opposite side of the lining, and to automatically release said low degree vacuum to discontinue the action of the apparatus, said latter means being controlled by the flow of milk from the teat cup.

In witness whereof we have hereunto set our hands in presence of two witnesses.

JOHN HARTNETT.
DAVID MOFFATT ROBISON.

Witnesses:
 BEDLINGTON BODYCOMB,
 W. J. S. THOMPSON.